(12) United States Patent
Gerdes et al.

(10) Patent No.: US 8,671,178 B2
(45) Date of Patent: Mar. 11, 2014

(54) INFORMATION PROCESSING SYSTEM AND METHOD PROVIDING A REMOTE ACCESS

(75) Inventors: Martin Gerdes, Monschau-Rohren (DE); Takeshi Matsumura, Kanagawa (JP); Toshikane Oda, Tokyo (JP); Kenta Yasukawa, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 154 days.

(21) Appl. No.: 13/380,260

(22) PCT Filed: Jun. 30, 2009

(86) PCT No.: PCT/JP2009/062258
§ 371 (c)(1),
(2), (4) Date: Jan. 18, 2012

(87) PCT Pub. No.: WO2011/001538
PCT Pub. Date: Jan. 6, 2011

(65) Prior Publication Data
US 2012/0117192 A1   May 10, 2012

(51) Int. Cl.
*G06F 15/173* (2006.01)
(52) U.S. Cl.
USPC ............ 709/223; 709/217; 709/219; 707/781
(58) Field of Classification Search
USPC .................. 709/217, 219, 249, 223; 707/781
See application file for complete search history.

(56) References Cited

U.S. PATENT DOCUMENTS

2001/0039565 A1* 11/2001 Gupta ........................... 709/203
2005/0216600 A1*  9/2005 Maron .......................... 709/236
2005/0232283 A1* 10/2005 Moyer et al. ................. 370/401

FOREIGN PATENT DOCUMENTS

| EP | 1031922 A2 | 8/2000 |
|---|---|---|
| WO | 0223924 A2 | 3/2002 |
| WO | 2005057325 A2 | 6/2005 |
| WO | 2005071895 A1 | 8/2005 |

OTHER PUBLICATIONS

Espinosa Carlin, J.M. "Realizing Service Composition in the IP Multimedia Subsystem." Innovations in NGN: Future Network and Services, 2008, K-INGN 2008, First ITU-T Kaleidoscope Academic Conference, May 13, 2008, pp. 343-350.
Khlifi, H. et al. "IMS for Enterprises." Communications Magazine, IEEE, vol. 45, issue 7, Jul. 2007, pp. 68-75.

* cited by examiner

*Primary Examiner* — Frantz Jean
(74) *Attorney, Agent, or Firm* — Coats and Bennett PLLC

(57) ABSTRACT

An information processing system for offering a remote access from a device to a virtual service provided in a local network is provided. The virtual service invokes native services provisioned by a service provider. The system comprising: a management unit managing service information specifying a shortcut component of the service; an obtaining unit obtaining a request for the virtual service from the device; a receiving unit receiving the service information from the management unit; a specification unit specifying a shortcut component for the requested virtual service based on the received service information; an invoking unit executing the specified shortcut component by invoking native services to the service provider, and transferring the other component of the requested virtual service to the local network; a combination unit combining results; and a response unit responding the combined result to the device.

12 Claims, 9 Drawing Sheets

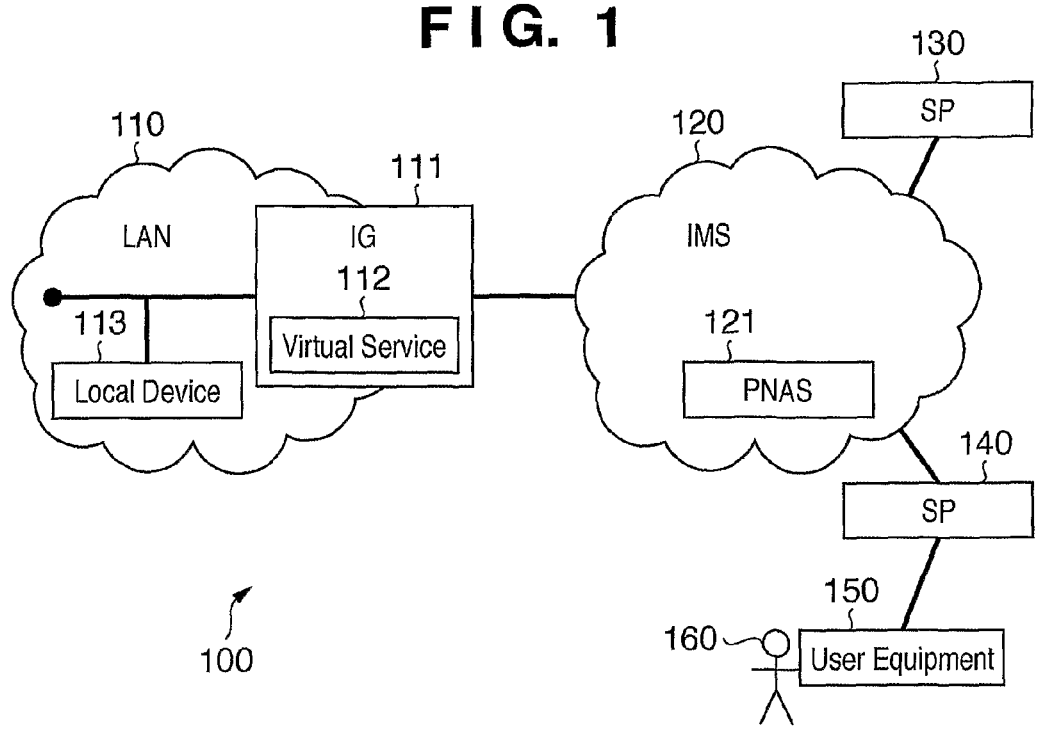
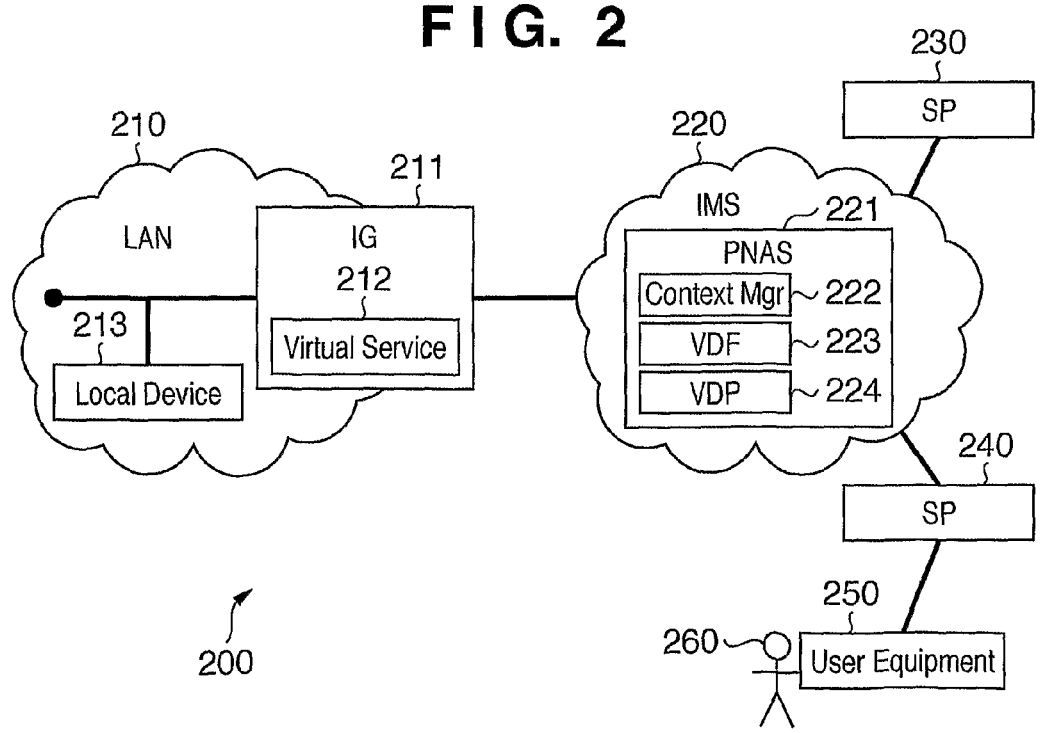

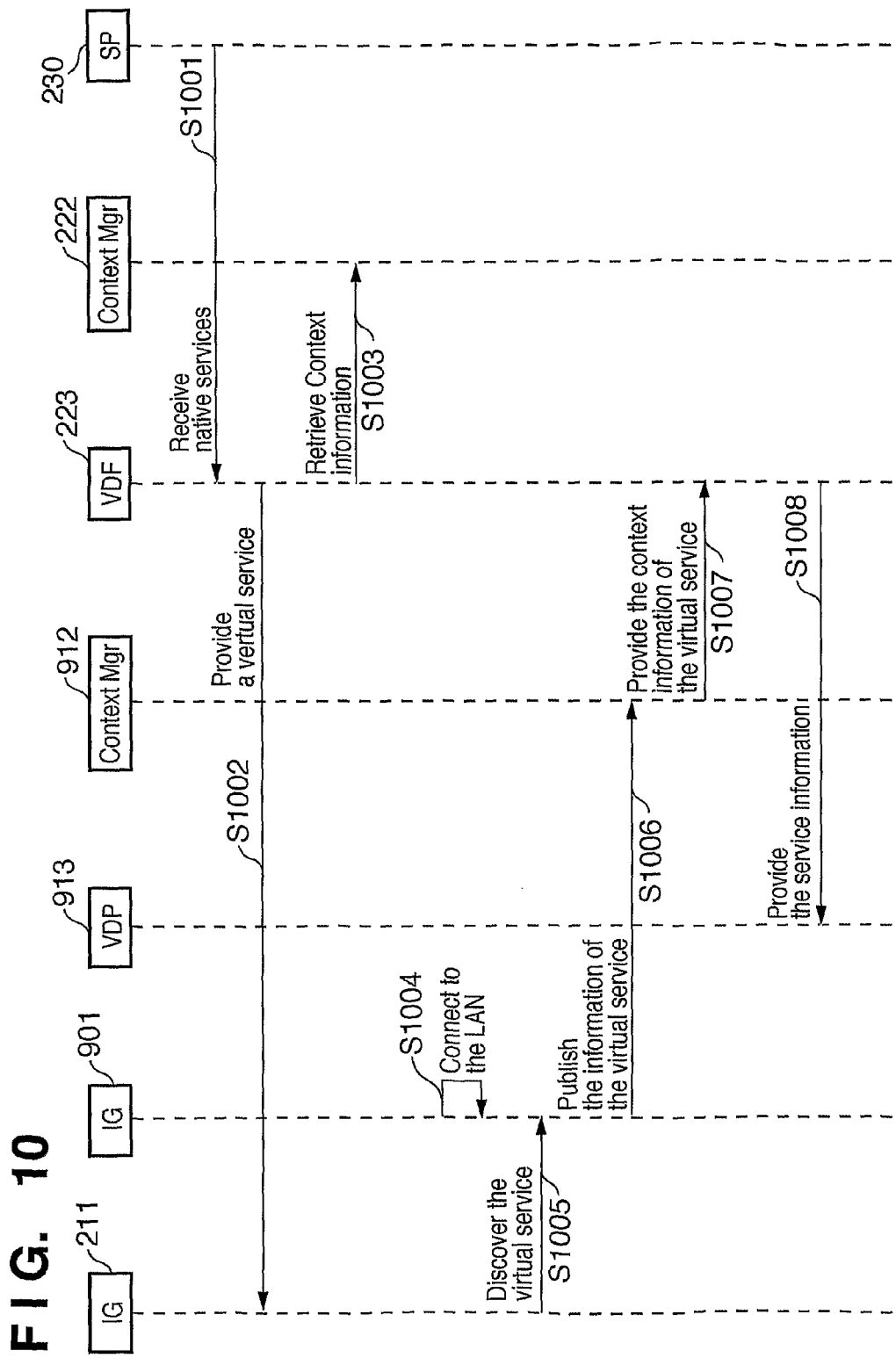

INFORMATION PROCESSING SYSTEM AND METHOD PROVIDING A REMOTE ACCESS

TECHNICAL FIELD

The present invention relates to an information processing system and method providing a remote access.

BACKGROUND

People today use multiple digital devices which are interconnected by various kinds of LAN (Local Area Network) and PAN (Personal Area Network) technologies. UPnP™ (Universal Plug and Play) and DLNA® (Digital Living Network Alliance) are standards focusing on the media consumption within home LANs, and allow users to play for example media stored in their network accessed storage (NAS) on a TV set in their living room. Furthermore, people have multiple portable devices and gadgets that are getting connected by LAN and PAN technologies while walking on the streets. At the same time, a lot of services are available in the Internet, offered by service providers or even by the user's own home networks, accessible through WAN (Wide Area Network) technologies. Numerous video sharing sites are available on the Internet. Also, many Internet radio stations are available, and Podcast sites offer audio and video together with well-formed meta-data.

As described in US20050210155, a service provider may expose the service in a residential network, a LAN for example, in the form of a virtual device. FIG. 1 illustrates an information processing system 100 to provide a virtual device. A LAN 110 is a residential network of a user 160, including an IG (IMS Gateway) 111 and a local device 113. The local device 113 connects an IMS (IP Multimedia Subsystem) environment 120 via the IG 111. The IMS environment 120 includes a PNAS 121 to create a virtual device as a composition of multiple services provisioned by a service provider (SP) 130. The virtual device implements one or more virtual services 112 provided by the IG 111. The IG 111 announces the virtual service 112 for the LAN 110 using a protocol supported there such as UPnP. The local device 113 can obtain a description of the service profile provided by the IG 111 and access to the service profile. The access to the virtual service 112 is translated to an access to the PNAS 121, and the result returned by the service provider 130 is again translated to the protocol supported by the LAN 110 and returned to the local device 113.

The PNAS 121 collects the context information from the LAN 110 and exposes the context information to service providers and end users. The context information contains the capability of the local device 113, sensors and actuators in the LAN 110 and services provided by them. It is updated when there is some event occurred in the local device 113 or a status in the local device 113 has changed. The IG 111 works as an intermediary entity to publish the context information towards the PNAS 121 in the secure and effective manner.

The IMS environment 120 may provide the user 160 with a remote access to the LAN 110. The user 160 accesses to services in the LAN 110 remotely using a user equipment 150. A service provider 140 provides the user equipment 150 with this remote access. The service provider 140 retrieves the service description of the virtual service 112 from the PNAS 121 and presents this service description to the user equipment 150. When the service provider 140 receives a request for the virtual service 112 from the user equipment 150, the service provider 140 transfers this request to the IG 111 after appropriate protocol conversions. The IG 111 executes the virtual service 112 and returns the result to the user equipment 150.

To execute the virtual service 112, the IG 111 requires the native service provisioned by the service provider 130. That is, the request from the user equipment 150 traversed the path of the service provider 140, the IG 111, and the service provider 130, and the response traverses the return path. This causes a trombone routing and the user 160 may experience a long latency.

SUMMARY

According to an aspect of the invention, an information processing system for offering a remote access from a device to a virtual service provided in a local network is provided. The virtual service invokes one or more native services provisioned by a service provider or invoking both the one or more native services and one or more local services provisioned by a local device resided in the local network. The system comprising: a management unit configured to manage service information specifying a shortcut component of the virtual service, the shortcut component executable by invoking one or more native services without invoking a local service; an obtaining unit configured to obtain a request for the virtual service from the device; a receiving unit configured to receive the service information from the management unit; a specification unit configured to specify a shortcut component for the requested virtual service based on the received service information; an invoking unit configured to execute the specified shortcut component by invoking one or more native services to the service provider, and to transfer the other component of the requested virtual service to the local network; a combination unit configured to combine results of executing the one or more invoked native services and a result responded from the local network; and a response unit configured to respond the combined result to the device.

Further features of the present invention will become apparent from the following description of exemplary embodiments with reference to the attached drawings.

BRIEF DESCRIPTION OF DRAWINGS

FIG. 1 illustrates an environment providing a virtual service.

FIG. 2 illustrates an exemplary environment including an information processing system 200 according to the first embodiment.

FIG. 10 illustrates exemplary operations of an information processing system 900 according to the third embodiment.

DETAILED DESCRIPTION

Figure 3:
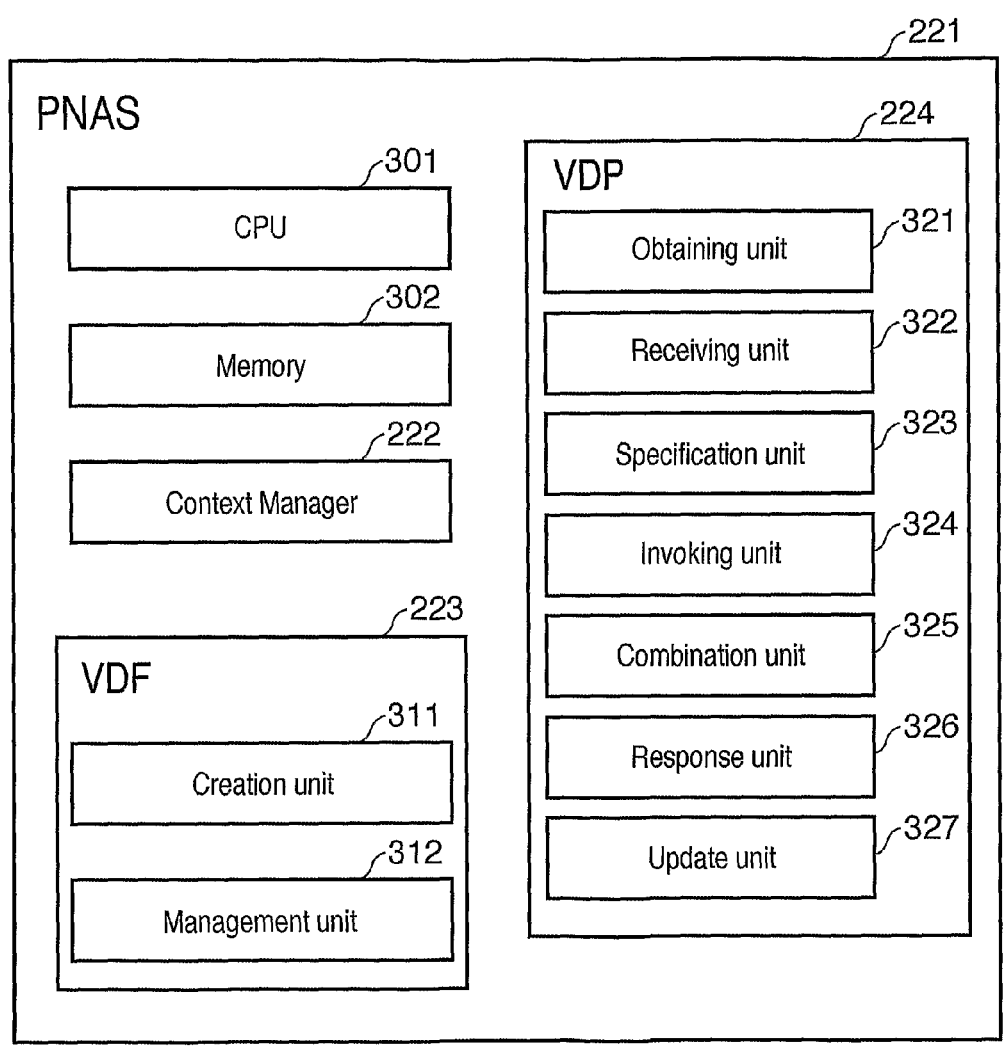
FIG. 3 illustrates an exemplary block diagram of the PNAS 221 according to the first embodiment.

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

First Embodiment

FIG. 2 illustrates an exemplary environment including an information processing system 200 according to first embodiment of the present invention. The environment includes a LAN 210, an IMS environment 220, a service provider 230, another service provider 240, and a user equipment 250.

The LAN 210 is a network which a user 260 uses personally, for example a home network and an in-car network. The LAN 210 includes a local device 213, which may be for example a TV, a game console, or a Home NAS. The LAN 210 may include more than one local device. The local device 213 provides the user 260 with one or more local services. The LAN 210 also may include even multiple user LANs and PANs. The LAN 210 may be a DLNA® network or may support the communication according to one or more of the following standards DLNA®/UPnP™, Bonjour® Zeroconf, Bluetooth®, ZigBee®, and IEEE 802.15.4 variants. Bonjour® may be used for media consumption in a LAN environment. Bluetooth® may be used for discovery and communication between devices, including audio playback in a PAN. ZigBee® and IEEE 802.15.4 variants may be used for sensor and actuator devices for, for example, home automation scenario.

The LAN 210 also includes an IG (IMS Gateway) 211. The IG 211 is an application layer gateway device between the IMS environment 220 and the LAN 210. The transportation and authentication of messages between the local device 213 and the IMS environment 220 are intermediated by the IG 211 and secured by security mechanisms provided by the IMS environment 220.

The service provider 230 is included in the Internet for example and provides one or more services. Hereinafter, services provided by the service provider 230 are called "native services."

The user 260 accesses to the LAN 210 from the outside using the user equipment 250. The user equipment 250 may be a mobile phone, a personal computer, a digital player, and the like. Another service provider 240 retrieves the information of the virtual devices from the PNAS 221 to provide a service to the user equipment 250. The service provider 240 allows the user 260 to access to the LAN 210 remotely.

The IMS environment 220 is managed by a network operator and includes a PNAS (Personal Network Application Server) 221. The PNAS 221 is an IMS enabler that allows exposing information about the LAN 210. According to this embodiment, the PNAS 221 includes a Context Manager 222, a VDF (Virtual Device Factory) 223, and a VDP (Virtual Device Proxy) 224.

The Context Manager 222 manages context information about the LAN 210. The context information is information relating local devices in the LAN 210, such as an internal state, capability, access history, and on-going sessions to the Context Manager 222. The context information may include information about available services in the LAN 210 and user policies for disclosure of this information. The IG 211 discovers the local device 213 in LAN 210 and publishes the device's information to the PNAS 221, and the Content Manager 222 aggregates the device's information of the LAN 210 as the context information. For example, the IG 211 sends UPnP M-search message to the LAN 210. The user devices in the LAN 210 respond to the M-search from the IG 211. The IG 211 fetches the context information from the local devices responded to the M-search. The IG 211 detects the capability of found local devices by issuing appropriate UPnP™ messages and uploads their context information to the Context Manager 222. The virtual service provided by another IMS environment may be discovered by the IG 211.

The VDF 223 receives a service description about a native service from the service provider 230 and provides the LAN 210 with a virtual service 212. A virtual service may be a composition of multiple services provisioned by multiple service providers. For example, the service provider 230 provisions the web service description which contains sufficient information for the VDF 223 to create the virtual service 212 toward the LAN 210. The VDF 223 also creates and manages service information per each virtual service 212. The service information is information relating the virtual service 212 and includes what kind of native services and local services are invoked, how to invoke the services with what parameters and so on. The service information also includes a shortcut component of the virtual service 212. The shortcut component is a component executable by invoking one or more native services without invoking a local service. That is, the VDP 224 does not need to transfer the shortcut component to the IG 211. The service information may also include indications indicating when the shortcut component executes and parameters used for invoking the virtual service 212. The VDF 223 creates the service information based on the service description provisioned by the service provider 230 and the context information retrieved from the Context Manager 222. The VDF 223 may intercept a service request from the virtual service 212 to the native services to make the protocol translation and to update the service information. The VDF 223 may provision one or more native services and the virtual service 212 may include a native service provisioned by the VDF 223. In this case, the VDF 223 works as a service provider.

The VDP 224 accepts a service request from the user equipment 250, executes the requested service based on the service information, and returns the result. FIG. 2 shows only one VDP 224. However, multiple VDPs may be prepared for one virtual service 212.

FIG. 3 illustrates an exemplary block diagram of the PNAS 221 according to this embodiment. The PNAS 221 includes a CPU 301, a memory 302, the Context Manager 222, the VDF 223, and the VDP 224. The CPU 301 controls overall operations of the PNAS 221. The memory 302 stores computer programs and data used for operations of the PNAS 221.

The VDF 223 includes a creation unit 311 and a management unit 312. The creation unit 311 creates the virtual service 212 based on the native services provisioned by the service provider 230. The virtual service 212 may invoke one or more native services, and may invoke both one or more native services and one or more local services provisioned by the local device 213. The management unit 312 manages the service information.

The VDP 224 includes an obtaining unit 321, a receiving unit 322, a specification unit 323, an invoking unit 324, a combination unit 325, a response unit 326, and an update unit 327. The obtaining unit 321 obtains a request for the virtual service 212 from the user equipment 250. The obtaining unit 321 may obtain the request using a protocol supported by the LAN 210. Further, the obtaining unit 321 may obtain a request for a local service provisioned by the local device 213 in the same way as the request for the virtual service 212.

The receiving unit 322 receives the service information from the management unit 312. The specification unit 323 specifies the shortcut component for the requested virtual service 212 based on the retrieved service information. The invoking unit 324 executes the specified shortcut component by invoking one or more native services to the service provider 130, and transfers the other component of the requested virtual service 212, if any, to the LAN 210. The invoking unit may convert the protocol used for the obtained request to a protocol supported by the service provider 130 in order to invoke the native services. The combination unit 325 combines results of executing the invoked native services and a result responded from the LAN 210, if any. The response unit 326 responds the combined result to the user equipment 250. The update unit 327 requires the management unit 312 to update the service information.

Figure 4:
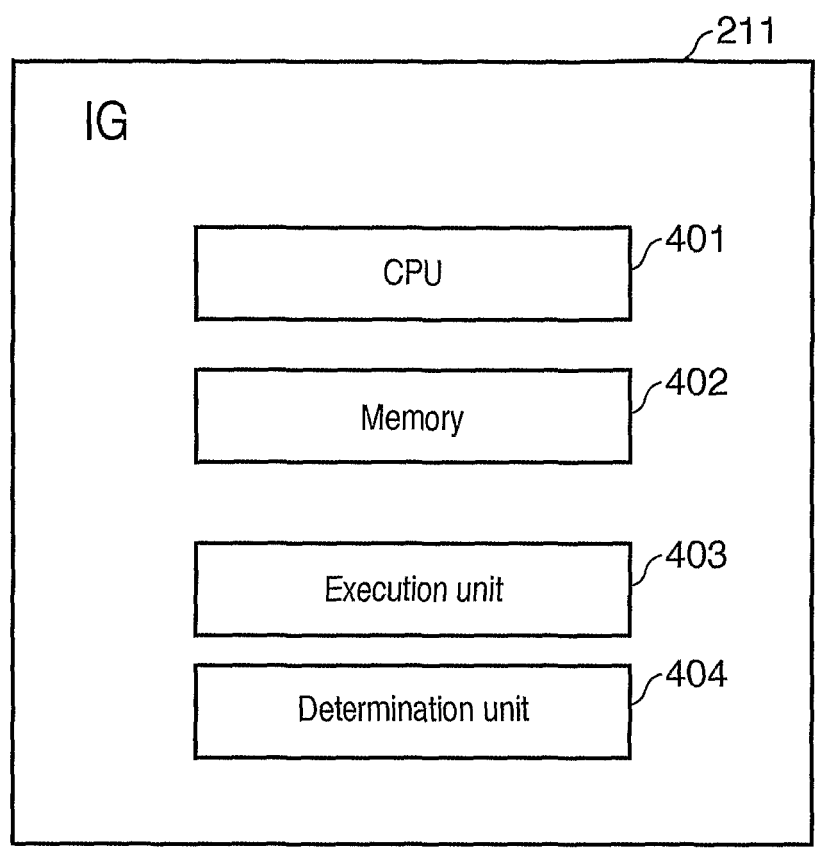
FIG. 4 illustrates an exemplary block diagram of the IG 211 according to the first embodiment.

FIG. 4 illustrates an exemplary block diagram of the IG 211 according to this embodiment. The IG 211 includes a CPU 401, a memory 402, an execution unit 403, a determination unit 404. The CPU 401 controls overall operations of the IG 211. The memory 402 stores computer programs and data used for operations of the IG 211. The execution unit 403 executes the local service and, if necessary, native services. The determination unit 404 determines whether the requested virtual service has invoked a local service. The update unit 327 obtains this determination from the determination unit 404.

Figure 5:
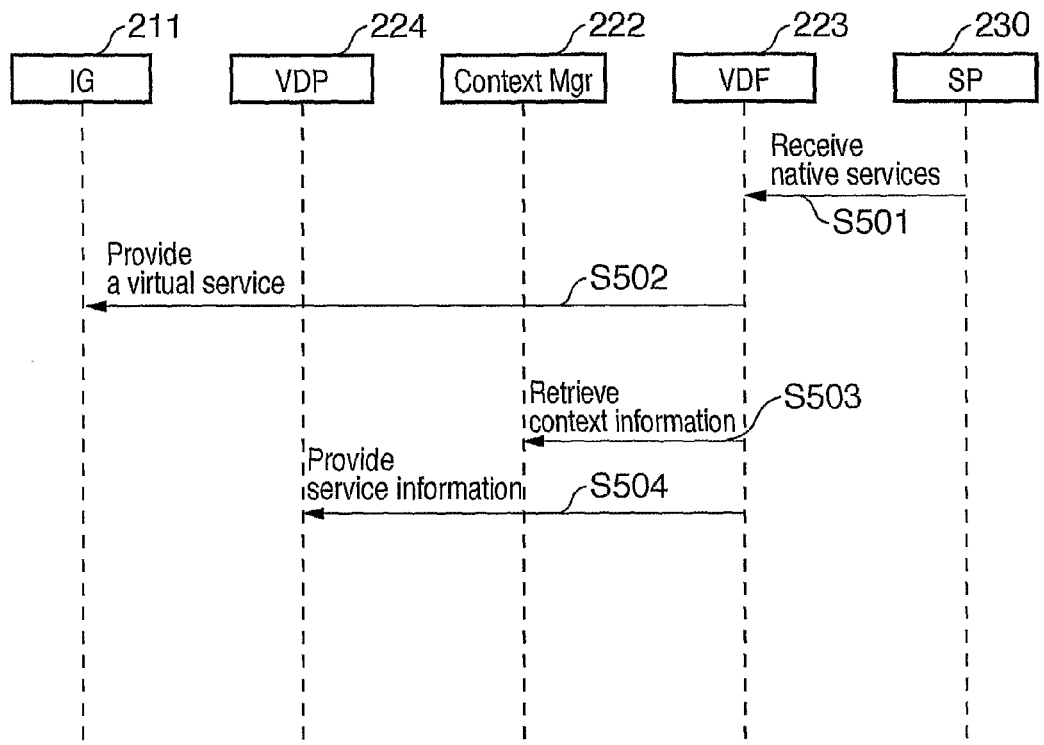
FIG. 5 illustrates exemplary operations of an information processing system 200 according to the first embodiment.
Figure 6:
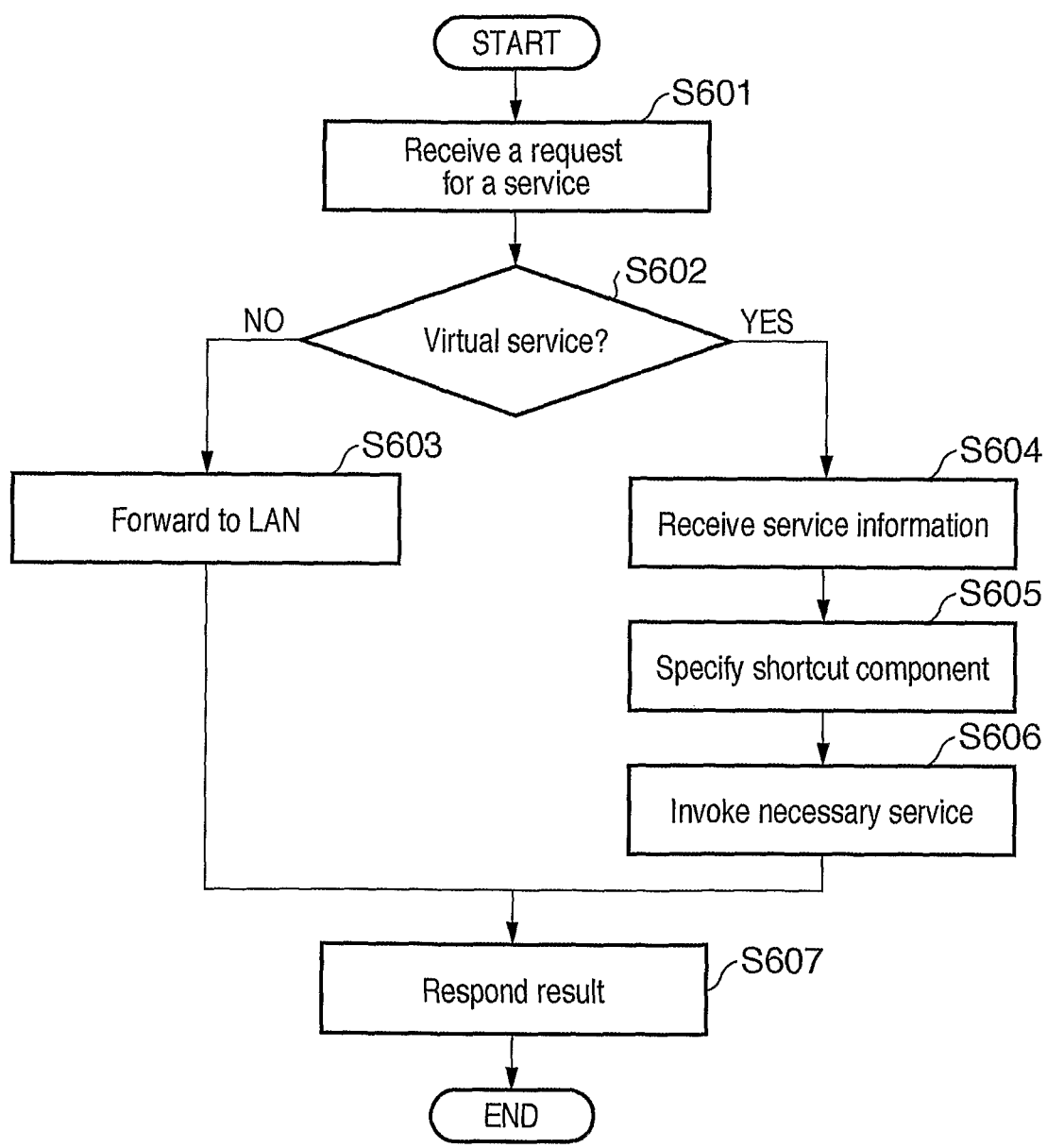
FIG. 6 illustrates exemplary operations of an information processing system 200 according to the first embodiment.
Figure 7:
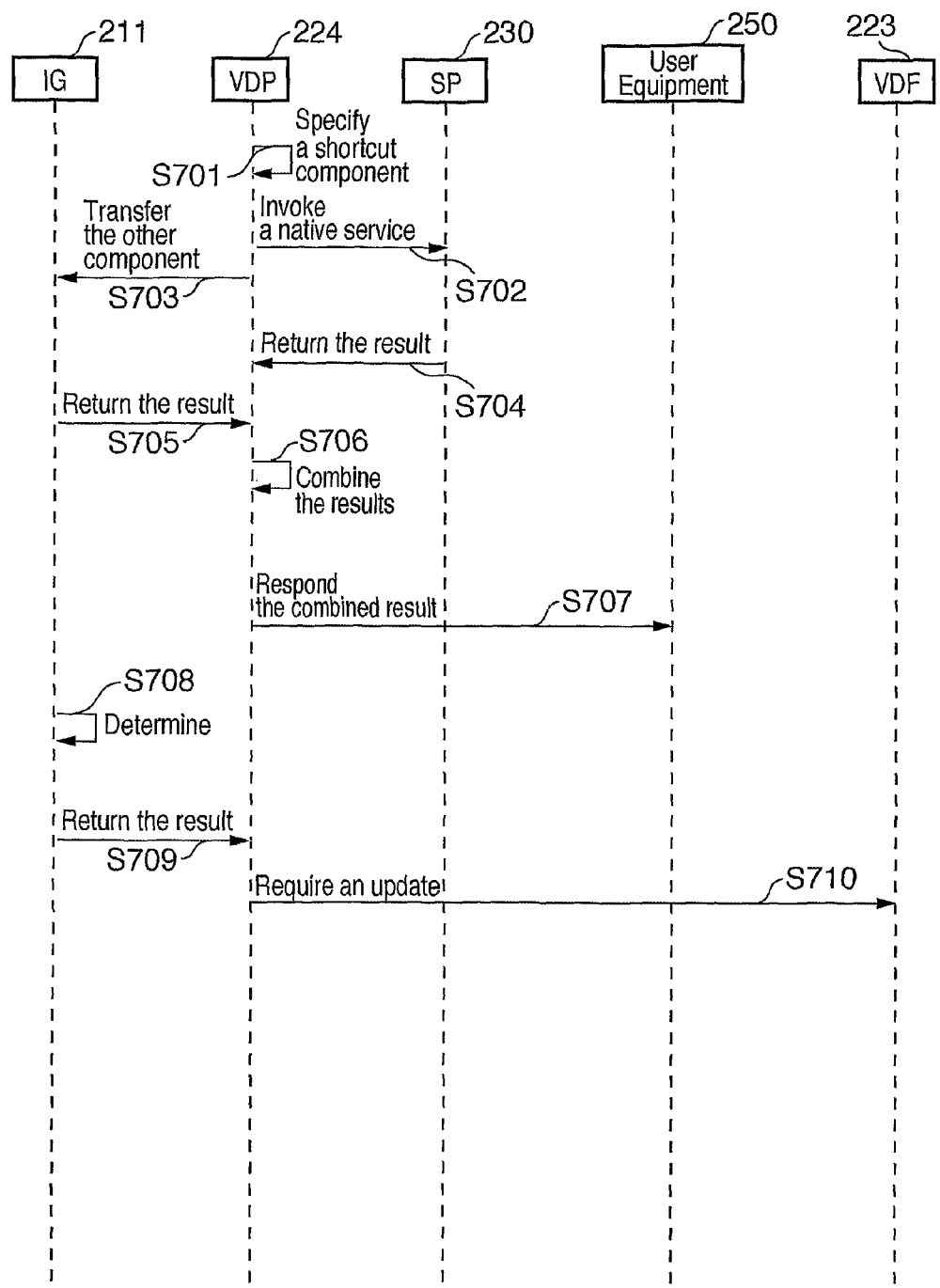
FIG. 7 illustrates exemplary operations of an information processing system 200 according to the first embodiment.

FIGS. 5 to 7 illustrate an example of overall operations of the information processing system 200 according to this embodiment. The CPU included in each device executes computer programs stored in memory of each device to process these operations.

FIG. 5 illustrates exemplary operations in which the VDF 223 provides the VDP 224 with the service information.

In Step S501, the creation unit 311 receives the service description of the native service from the service provider 230. In Step S502, the creation unit 311 creates the virtual service 212 according to the service description and provides the IG 211 with the virtual service 212. The creation unit 311 may composite multiple native services to create a single virtual service.

In Step S503, the management unit 304 retrieves the context information from the Context Manager 222. The context information contains the information of the local device 213 in the LAN 210. In Step S504, the management unit 304 creates the service information and provides the VDP 224 with the service information. In one scenario, the management unit 304 provides the service information in response to the provision of the native service in step S501. However, Step S504 may be carried out anytime after the execution of Step S501.

FIG. 6 illustrates exemplary operations when the VDP 224 receives a service request from the user equipment 250. These operations may be performed after the VDP 224 obtains the service information. Alternatively, the VDP 224 may obtain the service information in response to a request from the user equipment 250 toward the virtual service 212.

In Step S601, the obtaining unit 321 obtains a request for a service from the user equipment 250 via the service provider 240. The requested service may be a virtual service, or a local service provisioned by the local device 213. An example of the local service is file access in the LAN 210. In an example, the communication between the service provider 240 and the VDP 224 is done using SIP, and the service provider 240 can send an UPnP command over the SIP in order to control the target UPnP device, no matter if it's a real UPnP device or a virtual one. Other protocols than SIP may also be utilized. In one scenario, the user 260 opens a web browser and accesses a web site provided by the service provider 240 using the user equipment 250. The service provider 240 sends an UPnP action over SIP to control the virtual device to the VDP 224.

In Step S602, the specification unit 323 determines whether the requested service is a virtual service or a local service. The obtaining unit 321 may obtain a request to the virtual service 212 and handle it in the same manner as a request to the local service. When the requested service is a local service, the process proceeds to Step S603 and the invoking unit 324 forwards the request to the LAN 210 after appropriate protocol conversions. In Step S607, the response unit 326 responds a result responded from the LAN 210 to the user equipment 250.

When the requested service is a virtual service, the process proceeds to Step S604. In Step S604, the receiving unit 322 receives the service information for the requested virtual service. The management unit 312 may push the service information to the receiving unit 322 prior to a request and the service information may have already been stored in the memory 302. If the service information has not obtained yet, the receiving unit 322 retrieves the service information from the management unit 312.

Steps S605 to S607 are described in detail in FIG. 7. In Step S701, the specification unit 323 specifies a shortcut component for the requested virtual service based on the service information.

In Step S702, the invoking unit 324 executes the specified shortcut component by invoking one or more native services to the service provider 230. The invoking unit 324 translates the UPnP action into a SOAP request according to web service description of the service provider 230, and sends the SOAP request to the service provider 230.

In Step S703, the invoking unit 324 transfers the other component of the requested virtual service 212 to the LAN 210. In Step S704, the service provider 230 returns the result of the execution of the native service. The SOAP response from the service provider 230 is then translated into an UPnP response. In Step S705, the execution unit 403 returns the result of the execution of the local service.

The shortcut component may include multiple shortcut subcomponents. The other component of the requested virtual service 212 may also include multiple local subcomponents. The shortcut subcomponents and the local subcomponents may depend on each other. For example, a local subcomponent may require a result of execution of a shortcut subcomponent as a parameter.

In Step S706, the combination unit 325 combines the results from both the service provider 230 and the execution unit 403. In Step S707, the response unit 326 responds the combined results to the user equipment 250.

If there is no other component in Step S701, that is, the requested virtual service 212 is executed without invoking a local service, Steps S703, S705, and S706 may be omitted. On the other hand, if there is not a shortcut component, Steps S702, S704, and S706 may be omitted.

The request may require local services depending on the parameters for the request. In this case, since the service information may not specify a shortcut component, the invoking unit 324 may simply forward the request to the virtual device at Step S703. In Step S708, the determination unit 404 may determine whether the processing of the request has involved any local services. If it hasn't, in Step S709, the determination unit 404 may send this determination and the update unit 327 may obtain this determination. This determination process in Step S709 may be performed between Steps S703 and S705, and in this case, the determination result may be sent with the execution result of the local service in Step S705. In Step S710, the update unit 327 may require the management unit 312 to update the service information of the required virtual service based on the determination. The management unit 312 manages the parameters as a shortcut component of the virtual service 212. The management unit 312 may inform this update to the VDP 224 and other VDPs if any. Alternatively, the invoking unit 324 may manage the parameters locally and may determine whether the invoking unit 324 should transfer the other component hereafter based on the parameters.

Instead of Steps S708 and S709, the invoking unit 324 may send the request to both the virtual service 212 and the service provider 230. If they return the same response for the given parameter set, then the invoking unit 324 can forward the request only to the service provider 230 from the next time. Therefore, in this case, the update unit 327 also performs Step S710. Note that this method is applicable only when the request does not change any state in the virtual service 212 and the service provider 230 and it does not have any side-effects.

According to this embodiment, access latency is improved when the user equipment 250 requests the virtual service 212. Further, a service accessing a virtual device is kept de-coupled from the service provider providing the virtual device.

Second Embodiment

Figure 8:
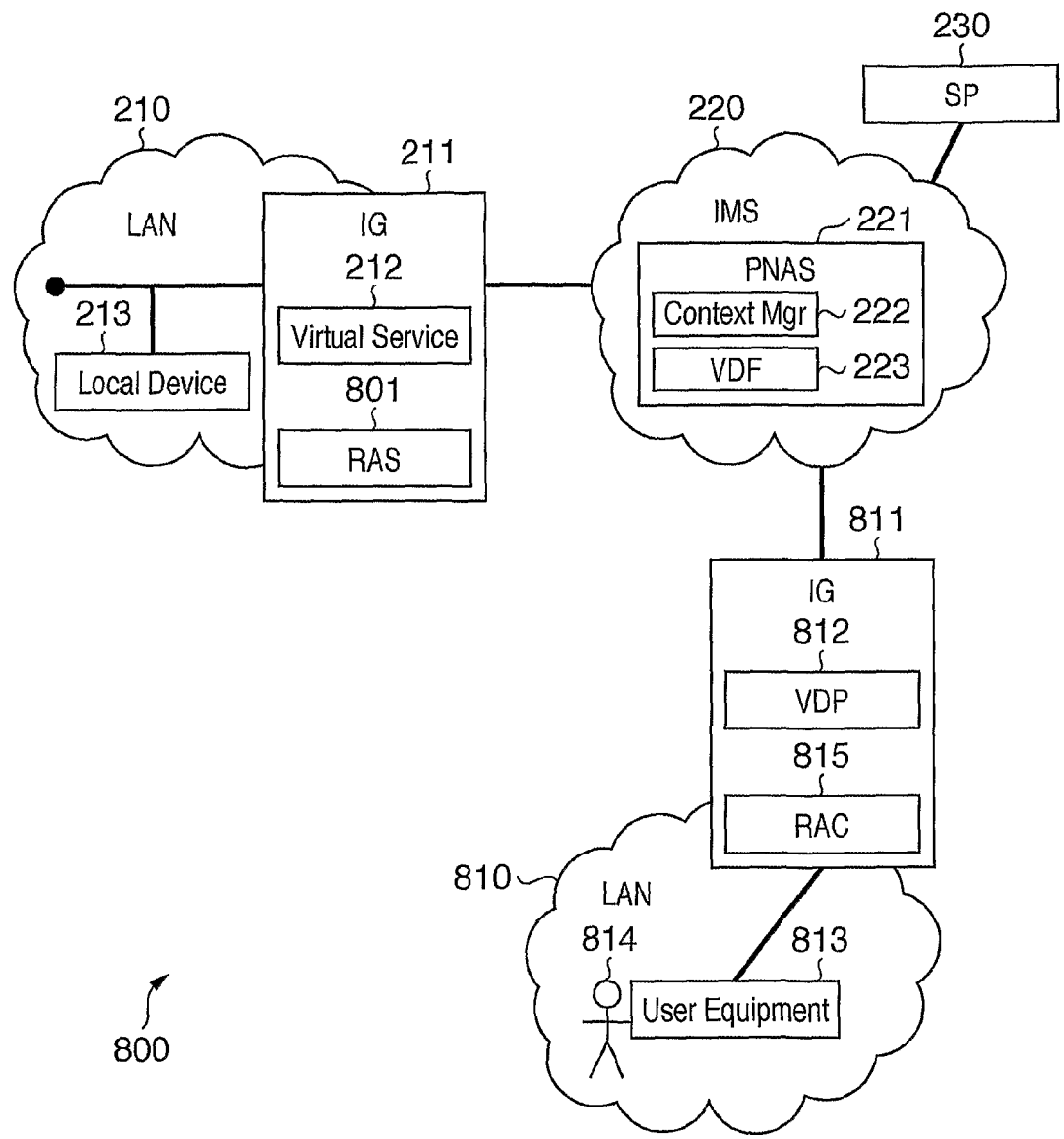
FIG. 8 illustrates an exemplary environment including an information processing system 800 according to the second embodiment.

FIG. 8 illustrates an exemplary environment including an information processing system 800 according to second embodiment of the present invention. Like components according to the first embodiment are given like reference numerals. The environment includes a LAN 210, an IMS environment 220, a service provider 230, another LAN 810.

The LAN 810 includes another IG 811 and a user equipment 813. According to this embodiment, the VDP 812 is included in the IG 811. A user 814 establishes a remote access session from the user equipment to the LAN 210 via the IMS embodiment 220. After the remote access session is established, the remote access server (RAS) 801 in the IG 211 exposes the information of the devices to the IG 811. At this point, the IG 211 notices that one of the devices is a virtual device and doesn't expose it.

The IG 211 requests the VDF 223 to provide the virtual service 212 to the IG 811. The remote access client (RAC) 815 advertises the virtual service 212 in the LAN 810 as well as the other local devices, and discovered by the UPnP CP. The user 814 manipulates the UPnP CP in the user equipment 813 and an UPnP action is sent to the RAC 815 in the IG 811. The RAC 815 forwards the request to the VDP 812. The VDP 812 performs operations as shown in FIGS. 5 to 7. According to this embodiment, the receiving unit 322 may retrieve the service information when the remote access session is established.

According to this embodiment, the native service provisioned by the service provider 230 is directly invoked from the IG 811, and thus access latency is improved.

Third Embodiment

Figure 9:
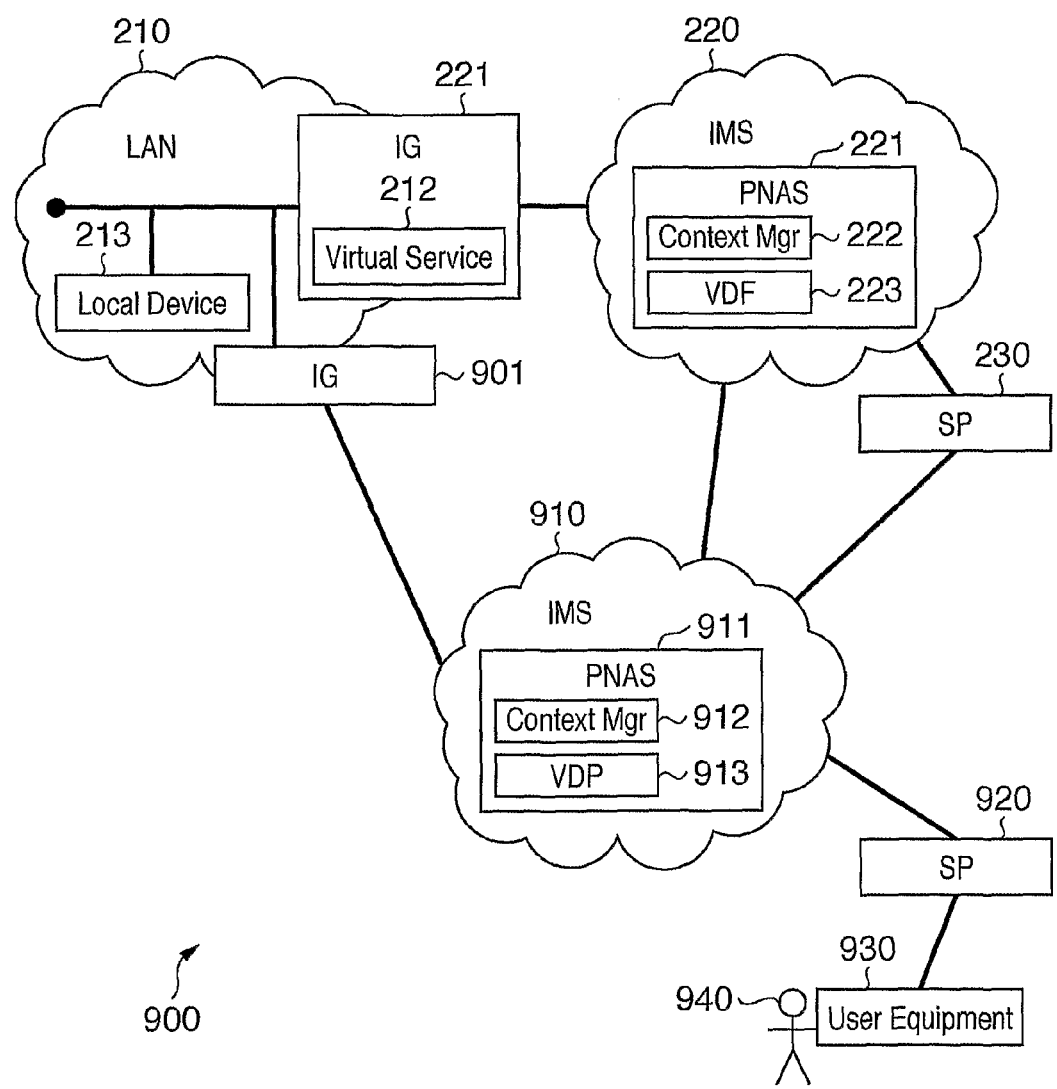
FIG. 9 illustrates an exemplary environment including an information processing system 900 according to the third embodiment.

FIG. 9 illustrates an exemplary environment including an information processing system 900 according to third embodiment of the present invention. Like components according to the first embodiment are given like reference numerals. The environment includes a LAN 210, an IMS environment 220, another IMS environment 910, a service provider 230, another service provider 920, and user equipment 930.

The IMS environments 220 and 910 have their own PNASs, a PNAS 221 and a PNAS 911. The PNAS 221 includes a Context Manager 222 and a VDF 223. The PNAS 911 includes a Context Manager 912 and a VDP 913. No data synchronization among the Context Managers is taken place. The LAN 210 includes two IGs, the IG 211 for the IMS environment 220 and the IG 901 for the IMS environment 910.

The user 940 accesses to the virtual service 212 in the LAN 210 using the user equipment 930. The service request for the virtual service 212 is intercepted by the VDP 913 and the VDP 913 performs operations as shown in FIGS. 5 to 7. According to this embodiment, the native service provisioned by the service provider 230 is directly invoked from the IMS environment 910, and thus access latency is improved.

FIG. 10 illustrates exemplary operations in which the VDF 223 provides the VDP 913 with the service information. The CPU included in each device executes computer programs stored in memory of each device to process these operations.

In Step S1001, the creation unit 311 receives the service description of the native service from the service provider 230. In Step S1002, the creation unit 311 creates the virtual service 212 according to the service description and provides the IG 211 with the virtual service 212. The creation unit 311 also provides the IG 211 with a contact information of the management unit 312. The contact information may include a URL, an IP address and a port number, or the like. In Step S1003, the management unit 312 retrieves the context information from the Context Manager 222. The context information contains the information of the local device 213 in the LAN 210. In Step S1004, the IG 901 is connected to the LAN 210. In Step S1005, the IG 901 discovers the virtual service 212. In Step S1006, the IG 901 publishes the information of the virtual service 212 to the Context Manager 912 in the IMS environment 910. In Step S1007, the Context Manager 912 provides the context information of the virtual service 212 to the management unit 312 in the VDF 223 based on the contact information. The management unit 312 creates or updates the service information based on the discovered virtual service 212. In Step S1008, the management unit 312 pushes the updated service information to the receiving unit 322. In this scenario, the VDF 223 provides the VDP 913 with the service information when the virtual service 212 is discovered by the IG 901.

The virtual service may be provisioned by a third party. When the IG 211 is connected to the LAN 210, the IG 211 may discover a virtual service which has already provisioned by a third party. As another example, when the third party provisions a virtual service, the IG 211 which has already been connected to the LAN 210 may discover the virtual service. In these cases, the IG 211, the Context Manager 222, and the VDF 223 may perform the above steps S1005 to S1008.

Other Embodiments

In the above Embodiments, the VDF 223 may be deployed in another entity than the PNAS 221. The VDF 223 may access to the Context Manager 222 in the PNAS 221 through a pre-defined API, or the VDF 223 may completely rely on the service description of the Native Services. The VDF 223 may also simply be provided by the Service provider 230 itself. The virtual service 212 may be provided other local device than the IG 111. The VDF 223 may be included in an unmanaged network, for example the Internet. The VDP 224 may also be included in the same or another unmanaged network.

In the above Embodiments, a user equipment requests for a virtual service. However, other devices may request for a virtual service. For example, in FIG. 2, the service provider 240 may request for the virtual service 212 in preparation for a user request.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing system for offering remote access from a device to a virtual service provided in a local network, the virtual service either invoking one or more native services that are native to and provisioned by a service provider located outside the local network, or invoking both the one or more native services and one or more local services provisioned by a local device residing in the local network, the information processing system comprising one or more processing circuits configured as:
    a management circuit configured to manage service information specifying a shortcut component of the virtual service, the shortcut component being executable by invoking one or more of the native services without invoking one of the local services;
    an obtaining circuit configured to obtain a request for the virtual service from the device;
    a receiving circuit configured to receive the service information from the management circuit;
    a specification circuit configured to specify a shortcut component for the requested virtual service based on the received service information;
    an invoking circuit configured to execute the specified shortcut component by invoking one or more of the native services without transferring the shortcut component to the local network, and to transfer another component of the requested virtual service to the local network;
    a combination circuit configured to combine results of executing the one or more invoked native services and a result from the local network; and
    a response circuit configured to respond to the device with the combined result.

2. The information processing system of claim 1:
    wherein the obtaining circuit is further configured to obtain the request using a first protocol supported by the local network; and
    wherein the invoking circuit is further configured to convert the request from using the first protocol to using a second protocol supported by the service provider in order to invoke the one or more native services.

3. The information processing system of claim 1:
    wherein the obtaining circuit is further configured to obtain a request for a local service in the same way as the request for the virtual service;
    wherein the invoking circuit is further configured to forward the request for the local service to the local network;
    wherein the response circuit is further configured to respond to the device with the result from the local network.

4. The information processing system of claim 1, wherein the one or more processing circuits are further configured as:
    a determination circuit configured to determine whether the other component of the requested virtual service has invoked a local service; and
    an update circuit configured to obtain the determination from the determination circuit;
    wherein, when the other component of the requested virtual service has not invoked a local service, the update circuit requires the management circuit to update the service information of the requested virtual service.

5. The information processing system of claim 1, wherein the one or more processing circuits are further configured as:
    a determination circuit configured to determine whether the other component of the requested virtual service has invoked a local service; and
    an update circuit configured to obtain the determination from the determination circuit;
    wherein, when the other component of the requested virtual service has not invoked a local service, the invoking circuit does not subsequently transfer the determined other component of the virtual service.

6. The information processing system of claim 1:
    wherein the virtual service is provided to the device via a managed network; and
    wherein the management circuit, the obtaining circuit, the receiving circuit, the specification circuit, the invoking circuit, the combination circuit, and the response circuit are included in the managed network.

7. The information processing system of claim 1:
    wherein the virtual service is provided to the device via a managed network;
    wherein the device is included in another local network which includes a gateway to connect to the managed network; and
    wherein the management circuit is included in the managed network, and the obtaining circuit, the receiving circuit, the specification circuit, the invoking circuit, the combination circuit, and the response circuit are included in the gateway included in the another local network.

8. The information processing system of claim 1:
    wherein the service provider is connected to the local network via a first managed network;
    wherein the virtual service is provided to the device via a second managed network; and
    wherein the management circuit is included in the first managed network, and the obtaining circuit, the receiving circuit, the specification circuit, the invoking circuit, the combination circuit, and the response circuit are included in the second managed network.

9. The information processing system of claim 1:
    wherein the management circuit is further configured to manage parameters used for invoking the virtual service; and
    wherein the specification circuit is further configured to specify the shortcut component based on the parameters.

10. The information processing system of claim 1, wherein the service information includes indications indicating when the shortcut component executes.

11. The information processing system of claim 1, wherein, when the virtual service is created, the management circuit pushes the service information to the receiving circuit.

12. The information processing system of claim 1:
    wherein the virtual service includes contact information of the management circuit;

wherein, when a gateway in the local network discovers the virtual service:
- the gateway provides the management circuit with the discovered virtual service based on the contact information;
- the management circuit updates the service information based on the discovered virtual service; and
- the management circuit pushes the updated service information to the receiving circuit.

* * * * *

UNITED STATES PATENT AND TRADEMARK OFFICE
CERTIFICATE OF CORRECTION

PATENT NO. : 8,671,178 B2  Page 1 of 1
APPLICATION NO. : 13/380260
DATED : March 11, 2014
INVENTOR(S) : Gerdes et al.

It is certified that error appears in the above-identified patent and that said Letters Patent is hereby corrected as shown below:

On the title page, in item (57), under "ABSTRACT", in Column 2, Line 6, delete "the service" and insert -- the virtual service --, therefor.

In the Specification

In Column 4, Line 3, delete "Content" and insert -- Context --, therefor.

In Column 7, Line 44, delete "embodiment 220." and insert -- environment 220. --, therefor.

Signed and Sealed this
Twenty-sixth Day of August, 2014

Michelle K. Lee
*Deputy Director of the United States Patent and Trademark Office*